United States Patent [19]

Corder et al.

[11] Patent Number: 5,936,221

[45] Date of Patent: Aug. 10, 1999

[54] SMART CARD SYSTEM AND METHOD FOR TRANSFERRING VALUE

[75] Inventors: Thomas E. Corder, San Ramon; Gary Sturm, Walnut Creek, both of Calif.

[73] Assignee: Bridgepoint Systems, Inc., San Ramon, Calif.

[21] Appl. No.: 08/942,748

[22] Filed: Oct. 2, 1997

[51] Int. Cl.⁶ ...................................................... G06K 5/00
[52] U.S. Cl. ..................... 235/380; 235/379; 340/825.33; 705/41
[58] Field of Search ...................................... 235/375, 379, 235/380, 381, 382, 382.5, 384, 451, 492; 902/26; 340/825.3, 825.31, 825.32, 825.33, 825.34, 825.35; 705/39, 41, 42, 44; 380/24

[56] References Cited

U.S. PATENT DOCUMENTS

| | | | |
|---|---|---|---|
| 4,988,849 | 1/1991 | Sasaki et al. | 235/379 |
| 5,224,046 | 6/1993 | Kim et al. | 235/375 X |
| 5,461,217 | 10/1995 | Claus | 235/380 |
| 5,621,796 | 4/1997 | Davis et al. | 235/379 X |
| 5,650,604 | 7/1997 | Marcous et al. | 235/379 |
| 5,732,136 | 3/1998 | Murphree et al. | 235/379 X |
| 5,811,771 | 9/1998 | Dethloff | 235/380 |

*Primary Examiner*—Thien Minh Le
*Assistant Examiner*—Jared J. Fureman
*Attorney, Agent, or Firm*—Flehr Hohbach Test Albritton & Herbert LLP

[57] ABSTRACT

A stored value system and method comprising a central server apparatus (10), one or more value added terminals (12), and one or more money-activated machines (14). The value added terminal (12) is designed to read smart cards (16) and to add cash value to the cards upon customer (18) input of an appropriate authorization code (22). The money-activated machine (14) is designed to read smart cards, and reprogram them by deducting a cash value amount corresponding to the customer's use of the machines. The central server apparatus (10) receives calls from customers requesting an authorization code for use with a value added terminal, and in response thereto, verifies funds in a pre-established customer account and provides an active authorization code.

7 Claims, 2 Drawing Sheets

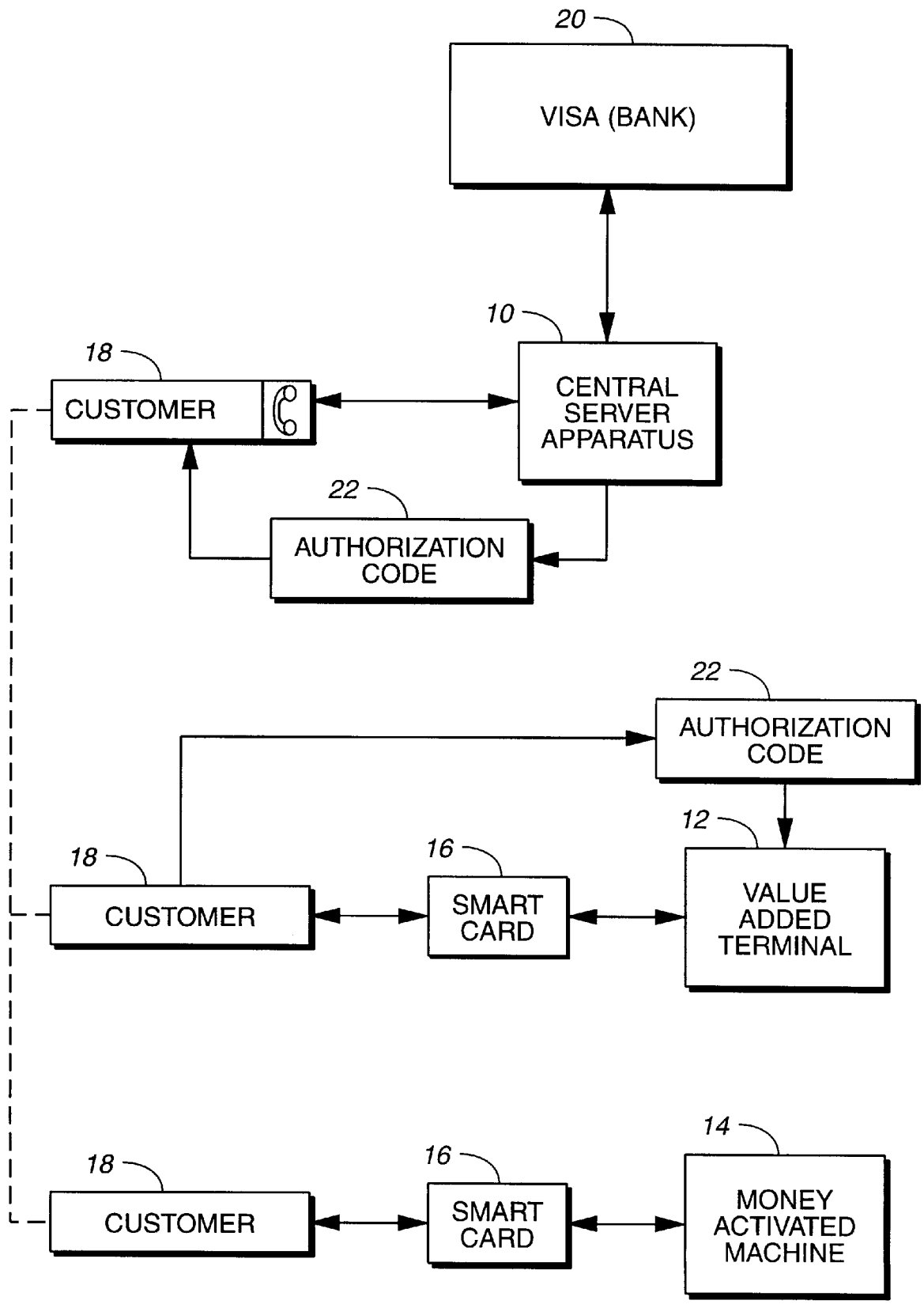
FIG._1

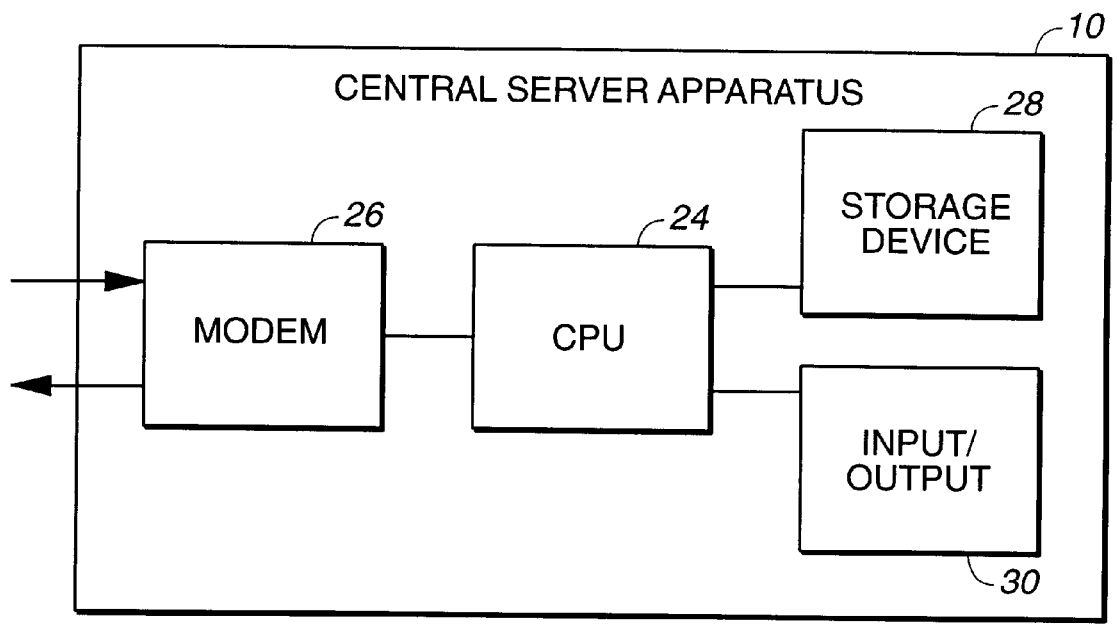
FIG._2
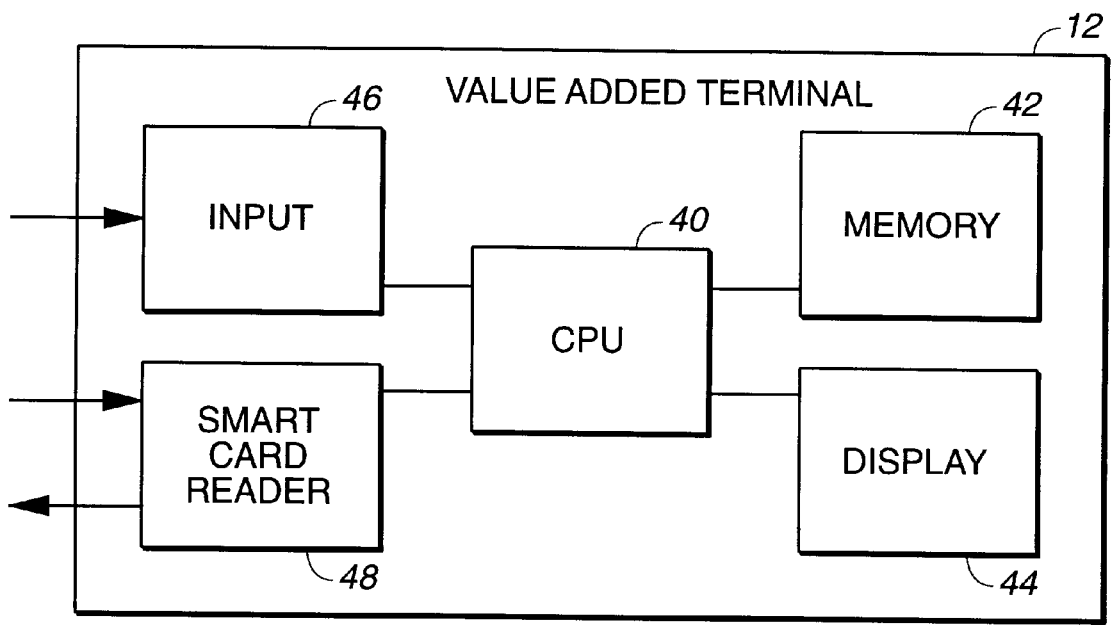
FIG._3

SMART CARD SYSTEM AND METHOD FOR TRANSFERRING VALUE

TECHNICAL FIELD

The present invention relates to smart card-type cash transfer systems that allow customers to use self service machines, such as laundry and vending machines, without requiring cash.

BACKGROUND ART

Smart cards are credit card sized devices with on-board computer chips that provide the ability to carry digital cash on the chip and with the card. Smart cards are extremely convenient in certain payment systems, such as self service vending, because they eliminate the need for immediate cash, and they also eliminate associated problems like making change, processing coins, as well as the potential for vandalism and fraud.

To use a smart card in a vending application, a customer inserts the card into a card reader, typically located at or nearby the vending equipment site. The card must be authorized within the particular electronic payment system associated with the card in order to transfer electronic cash. The chip on the smart card and the chip on the reader execute a series of communication protocols to establish card authenticity, card I.D. number, and available stored cash value. Once this verification is completed, the reader removes the appropriate amount of stored value from the card in a single price application, or in a multiple price application, the customer selects a product or service, and the appropriate stored value amount is removed from the chip's memory.

The electronics for removing stored values from a smart card is relatively straightforward, but adding value is more complex because it requires a source of available funds from which to draw. In point of service applications, two methods are commonly employed to add funds The first requires a customer to add cash to a smart card reader at a value added terminal. The value added terminal then transfers value onto the card equivalent to the amount of cash inserted into the terminal. A disadvantage of this system is that it involves cash, which creates the possibility of vandalism, theft and fraud.

A second system utilizes a customer's pre-existing bank account. With this system, a customer uses a bank card or an ATM card, rather than cash, to access funds to be added to the smart card. An internal transaction processing modem, such as those used for retail point of sale check out counters, performs a standard process of gaining approval for the fund transfer. The transaction is completed usually by batching together a number of similar transactions. Once the charge or debit authorization is obtained, the terminal then adds the stored value to the smart card.

While this account-to-card process eliminates cash from the process, it has two drawbacks. One, a transaction processing modem is required, which can be an expensive piece of equipment, usually several hundred dollars, and there is additional telephone line expense, which can be justified for large volume sales operations, but for many small scale retail operations can be cost prohibitive. Second, not all potential customers have bank accounts with associated credit cards or debit cards.

It is an object of the present invention to provide a cashless means for handling self-service transactions that is easy for customers to use and relatively inexpensive for businesses to install and maintain.

DISCLOSURE OF INVENTION

Briefly described, the stored value system of the present invention comprises a system for transferring value from an account of a customer to a smart card for use in operating money-activated machines, wherein the system includes a central server apparatus having a storage device with a plurality of active authorization codes each having a cash value associated therewith. The system also includes one or more value added terminals remote to the central server apparatus and preferably adjacent or convenient to nearby money-activated vending-type machines. Each value added terminal includes on-board secure memory for storing the authorization codes and associated cash values of the central server apparatus and an input device responsive to customer input of the authorization code associated with the customer's request. For the system to work effectively, it is necessary that the total number of possible authorization code inputs be substantially greater than the number of authorization codes stored in the secure memory, in order to prevent fraudulent use of the system. Each value added terminal further is adapted to add cash value onto the smart card in an amount equal to the cash value associated with the inputted authorization code and then deactivate the inputted authorization code from its memory so that subsequent input of the deactivated authorization code will not cause cash value to be added onto the smart card.

In operation, a customer can telephone the central server apparatus and obtain an authorization code that corresponds with a requested cash value transfer, which authorization code the central server apparatus provides upon verifying the availability of funds in the customer's account, and the customer can then input the authorization code into the input device of the value added terminal. The value added terminal then adds the cash value associated with the inputted authorization card onto the smart card and dispenses the programmed smart card to the customer, whereafter the customer can use the smart card to operate a money-activated machine.

The central server apparatus can be fully automated, wherein the central server apparatus includes a communications device for receiving a communication from a customer requesting transfer of value and for verifying the availability of funds in the account of the customer. Upon verification, the central server apparatus provides an authorization code with a cash value corresponding to the customer's request and deactivates the provided authorization code from its memory.

According to an aspect of the invention, portable means are included for transferring active authorization codes with associated cash values from the central service center to each value added terminal. Such means can take the form of portable computer disks programmed with new active authorization codes. Periodically, new active authorization codes are required to replenish codes deactivated through customer requests.

Each smart card has an onboard memory device for storing a screening code for verifying that the smart card is associated with the system. The screening code is unique to the money-activated machine of the system. The value added terminal is adapted to read the screening code prior to adding cash value onto the smart card, in order to verify that the smart card is authorized for use with the system. This prevents the system from allowing other smart cards access to the machines.

The present invention also includes a method for transferring value from an account of a customer to a smart card for use in operating money-activated machines. The method includes the steps of receiving a communication at a central server apparatus from a customer requesting transfer of value from the account to a smart card, verifying from the central server apparatus the availability of funds in the account of the customer, and upon verification of available funds, providing an authorization code to the customer. The authorization code has a cash value associated with it that equals the requested transfer of value. The method further includes the step of deactivating the authorization code so that authorization code is no longer available to be provided to customers. The authorization code is selected from a plurality of active authorization codes, each with associated cash values, and which are stored in a memory device of the central server apparatus. The method also includes the steps of providing a value added terminal remote to the central server apparatus, with the value added terminal including a memory device that stores the authorization codes and their associated cash values, and inputting the authorization code into an input device of the value added terminal, which is capable of receiving a total number of authorization code inputs that is substantially greater than the number of authorization codes stored in memory. Finally, the method includes the steps of adding cash value onto the smart card in an amount equal to the cash value associated with the inputted authorization code, and deactivating the inputted authorization code in the memory device of the value added terminal, so that an attempt to re-input the same authorization code will not cause cash value to be added onto the smart card.

According to an aspect of the method, the additional step of storing a screening code on the smart card is included in order to verify that the smart card is authorized for use with the system. The screening code is unique to the money-activated machine of the system in order to prevent other smart cards access to the money-activated machines. The step of verifying the screening code prior to adding cash value onto the smart card is also part of this aspect of the invention.

According to another aspect of the present invention, an additional step of activating additional authorization codes in the memory device of the central server apparatus is included in order to periodically change the active authorization codes. Each additional authorization code has a cash value associated therewith, and is transferred to the memory device of the value added terminal.

These and other features, objects, and advantages of the present invention will become apparent from the following description or the best mode for carrying out the invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein:

FIG. 1 is a schematic diagram representing the method arid system of the present invention;

FIG. 2 is a schematic diagram of the central server apparatus of the system of FIG. 1;

FIG. 3 is a schematic diagram of the value added terminal of the system of FIG. 1;

BEST MODE OF CARRYING OUT THE INVENTION

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

Referring to FIG. 1 the stored value system of the present invention includes a central server apparatus 10 and one or more value added terminals 12. The value added terminals 12 are each located at convenient locations relative to money-activated machines 14, such as laundry machines, vending machines, public phones, or any other type of machine that ordinarily operates with cash.

Both the value added terminal 12 and the money-activated machine 14 are capable of reading smart cards 16. A smart card is an electronically readable credit card sized device with a digitally programmable computer chip on board that is capable of carrying "digital" cash. These types of cards are being used more and more for a variety of transactions, and are generally well known. The particular design of the smart card itself forms no part of the invention and any type of electronically programmable, digital card can be used with the system and method of the present invention.

The stored value system of the present invention comprises three main parts or steps. First, a customer 18 telephones the central server apparatus 10 and requests a transfer of value, i.e. money, from a pre-established account of the customer at a bank 20, for example, to an account of the entity operating the stored value system of the present invention. The transfer of funds (or value) from the customer's account to the system's account is an electronic funds transfer that occurs through the automated clearinghouse process as is conventional for current fund transfers. However, the present invention is not meant to be limited to a particular mechanism or process for transferring funds from the customer's to the system's account, and any known method or conventionally used method is envisioned. Although, as telecommunications technology progresses, future fund transfer systems may also be applicable for use with the present invention, such as fund transfers through the Internet.

Preferably, the central server apparatus 10 includes a communications device, such as a modem, and a computer and appropriate software to run the modem, that can automatically receive the customer's request for a fund transfer and in response thereto telephone the customer's bank 20 to verify the availability of funds in the customer's account. However, a person stationed at the central server apparatus could manually receive the customer's call and then manually phone the customer's bank.

The central server apparatus includes a storage device, such as computer memory, in which is stored a plurality of authorization codes. Each authorization code has a dollar value associated with it, and different authorization codes can have the same dollar value, which in fact is desirable. Upon verification of available funds in the customer's account, an authorization code 22 is provided to the customer, either automatically by the central server apparatus or manually by the person stationed at the central server apparatus. The authorization code provided to the customer is preferably associated with the dollar amount that the customer originally requests, but it is foreseeable that a customer could request dollar amounts in which the central server apparatus is not programmed to provide. In this case, the customer is so notified and is required to make another request, typically of the closest dollar value that is available.

Once an authorization code is provided to a customer, the authorization code is deactivated, so that it cannot be provided to other customers. The authorization codes programmed into the central server apparatus that are available, i.e. have not been previously given to a customer, are considered active authorization codes.

The central server apparatus is programmed with a sufficient number of authorization codes to handle the total possible number of transactions at the value added terminals 12, discussed later. It is also necessary that there be a total possible number of authorization codes not having associated dollar values in order to prevent unauthorized use of the system. For example, if the authorization code sequence includes five numbers, for a total possible number of authorization codes of 3125 code numbers, it is desirable to keep the number of authorization codes having dollar values to about 1% of this number, or about 300 codes. Thus, there would, with this example, be approximately 2800 dummy codes. This is discussed in more detail later.

Upon getting an authorization code, the customer goes to a value added terminal 12 and inputs the authorization code, preferably through a keypad input device. The value added terminal can either contain a supply of smart cards from which it can select one and program with the dollar amount associated with the authorization code, or preferably, the customer already owns a smart card and simply inputs the card into a card reader slot in the terminal. Either way, the smart card is then programmed with a dollar amount associated with the authorization code, which can be added to an existing dollar amount already on the smart card.

The value added terminal 12 also includes a computer and an on-board memory storage device that is programmed with the authorization codes that have dollar values. The computer may or may not be programmed with the dummy codes. If so programmed, the computer recognizes a dummy code input by a customer by matching it with its preprogrammed codes. If not preprogrammed with the dummy codes, the computer simply rejects an inputted dummy code as not being an active authorization code. The computer can also be programmed with less than the total number of authorization codes having dollar values, which may be practical where the value added terminal is in a low traffic area.

After the value added terminal programs a smart card with a cash value, the authorization code is deactivated, in a manner similar to the central server apparatus. Also, the particular authorization code used to add cash value is flagged onto the smart card so that the customer then cannot take the card to a another value added terminal and input the same authorization code to add an additional equivalent amount of cash to the card.

In order for the system to prevent fraud by those who do not first obtain an authorization code, it is necessary that the total number of possible authorization codes be substantially greater than the number of authorization codes stored in memory at the value added terminal. In this manner, if a customer inserts a smart card and then inputs an unauthorized dummy code, in other words the customer simply takes a guess at an active or valid authorization code, the chances of correctly guessing are low, preferably as low as 1% or less. Since the customer could repeatedly guess, it is desirable to limit the number of guesses that the value added terminal will accept for a particular transaction. By limiting the number of allowed guesses, which are really acceptable incorrect inputs, the value added terminal can place a flag in the card that can be recognized in the future should the customer attempt to guess again at acceptable codes, either with the same value added terminal or another value added terminal associated with the system.

Each smart card is also programmed with a specific code that is recognized by the value added terminals as being the code for the system of the present invention. Thus, when a customer inserts a smart card into a value added terminal, the terminal first verifies that the card is authorized for use with the money-activated machines of the present invention. The smart cards can either be preprogrammed with specific screening codes or the value added terminals can program the smart cards when a new card is issued.

After the value added terminal 12 adds cash value to a smart card 16, the card is dispensed to the customer, who can then use the card as "electronic" or "digital" cash at any of a number of money-activated machines 14 that are included as part of the system. For this, it is also necessary that each money-activated machine be able to read the screening code on the smart card, so that the machine only accepts cards that are part of the system and rejects all other cards. It is also necessary that each money-activated machine 14 be able to deduct from the smart card a cash value equivalent to the customer's use of the machine.

Referring to FIG. 2, central server apparatus 10 is shown schematically to include a central processing unit (CPU) 24, a modem 26 for receiving calls, or other types of communications, from a customer, and for calling the customer's bank or other financial institution where the customer has an account. A storage device 28 is preprogrammed with the authorization codes and their associated dollar amounts, and also includes appropriate software for controlling operation of central server apparatus. An input/output device 30, such as a keyboard, can be used to manually control operation of the CPU if desired.

With an automated central server apparatus, the CPU 24 can be software controlled to automatically receive calls from customers, and to prompt the customers for appropriate customer identity codes and dollar amount transfer requests. In response to the customer providing, this information, such as through use of a telephone keypad, the CPU then calls the customers bank, the identity of which is already programmed into the storage device 28. The CPU communicates with compatible bank computers to verify fund availability and to effect the transfer of funds, through standard ACH accounts, which authorize direct debiting of the customer's account. Alternatively, the customer can provide a credit card number to effect transfer of funds. With this method, a charge appears on the customer's monthly credit card bill.

Referring to FIG. 3, the value added terminal 12 includes a CPU 40, an on-board memory device 42, a display 44, an input device 46, such as a keypad, and an electronic smart card reader device 48. When a customer inserts a smart card into reader 48, the CPU verifies the smart card as being authorized for use with the system, and then prompts the customer, through the display 44, for an authorization code. The customer inputs the authorization code provided from the central server apparatus, which the CPU verifies as being an active authorization code. If active, the CPU instructs the reader 48 to add a dollar amount associated with the code to the customer's smart card, and then deactivates the authorization code in memory 42. If a non-active authorization code is inputted, the CPU indicates such on the display 44 and prompts the customer to input another authorization code. If the limit for input attempts is set at three, then after three unsuccessful attempts by the customer to input an active authorization code, the reader programs the smart card with a flag to indicate that the card is no longer acceptable for use with any of the value added terminals of the system. In this manner, if the customer then attempts to insert the smart card into another value added terminal located elsewhere and correctly guesses at an authorization code, the CPU will not add cash to the card due to the flag.

If a customer inserts a valid smart card without first obtaining an authorization code, and then correctly guesses and inputs an active authorization code, the customer has "beat" the system, and has a cash value associated with the customer's correctly guessed authorization code added to the customer's smart card. However, the chances of this happening can be kept low by limiting the number of valid authorization codes. Even if a person is successful in beating the system, all the system loses is the cash value added to the card, which can only be used at money-activated machines associated with the system.

One of the advantages of the present invention over on-site credit card verification modems is that the present invention is much less expensive, due to the elimination of on-site modems, which can be relatively expensive. The present invention requires only a single modem at the central server apparatus.

Another advantage of the present invention is its elimination of cash at the vending machine site. Cash-to-card systems require a customer to insert cash at value added terminals in order to add value to their smart cards.

Account-to-smart cards require the use of bank credit cards or debit cards at the value added terminals, which again require modems for affecting fund transfers.

The stored value system and method of the present invention does not require on-site cash or a transaction processing modem. The system is "self-contained" in that the value added terminal can handle on-site value adding transactions by itself. However, it is desirable to periodically load or program the value added terminals with new sets of active authorization codes. This can be accomplished with a portable transfer device, such as a computer disk, that can manually be inserted into the value added terminals in order to reprogram their stored authorization codes.

When reprogramming the authorization code database at each value added terminal, it is necessary that the previous active authorization codes provided to customers be maintained so that the customers can still input these active codes. Thus, reprogramming essentially entails adding new authorization codes to each value added terminal. There is no reason to delete from the list of active authorization codes those codes not yet provided to customers.

It is also desirable for the central server apparatus to keep track of the use of valid authorization codes. In other words, when a person uses an authorization code, it is desirable that the central server apparatus know this so that the particular code used can eventually be reused. It is possible for the system to assume that the authorization codes are used within a predetermined time period, such as a month for example. But this may not always be the case and a tracking system may be useful. For this, each value added terminal, when restocked with new authorization codes, is programmed to download the used authorization codes for transfer back to the central server apparatus. With all of the value added terminals providing feedback on used authorization codes, the central server apparatus can maintain a clean set of activated and deactivated codes without having to maintain, beyond a short period of time, a database of released but unused authorization codes.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto when read and interpreted according to accepted legal principles such as the doctrine of equivalents and reversal of parts.

What is claimed is:

1. A system for transferring value from an account of a customer to a smart card for use in operating money-activated machines, comprising a central server apparatus having a storage device with a plurality of active authorization codes each having a cash value associated therewith, a value added terminal remote to the central server apparatus and including on-board secure memory storing the authorization codes and associated cash values of the central server apparatus and an input device responsive to customer input of the authorization code associated with the customer's request, the total number of possible authorization code inputs being substantially greater than the number of authorization codes stored in the secure memory, and the value added terminal further adapted to add cash value onto the smart card in an amount equal to the cash value associated with the inputted authorization code and deactivate the inputted authorization code so that subsequent input of the deactivated authorization code will not cause cash value to be added onto the smart card, whereby a customer can telephone the central server apparatus and obtain an authorization code that corresponds with a requested cash value transfer, which authorization code the central server apparatus provides upon verifying the availability of funds in the customer's account, and the customer can then input the authorization code into the input device of the, value added terminal, whereafter the value added terminal adds the cash value associated with the inputted authorization card onto the smart card and dispenses the programmed smart card to the customer, whereafter the customer can use the smart card to operate a money-activated machine.

2. The system of claim 1 wherein, the central server apparatus also including a communications device for receiving a communication from the customer requesting transfer of value and verifying the availability of funds in the account of the customer and upon verification providing an authorization code with a cash value corresponding to the customer's request and deactivating the provided authorization code.

3. The system of claim 1 and further comprising, portable means for transferring active authorization codes with associated cash values from the central service center to each value added terminal.

4. The system of claim 1 wherein, the smart card has an onboard memory device for storing, a screening code for verifying that the smart card is associated with the system, the screening code being unique to the money-activated machine of the system, and the value added terminal is adapted to read the screening code prior to adding cash value onto the smart card, in order to verify that the smart card is authorized for use with the system.

5. A method for transferring value from an account of a customer to a smart card for use in operating money-activated machines, comprising the steps of, receiving a communication at a central server apparatus from a customer requesting transfer of value from the account to a smart card, verifying from the central server apparatus the availability of funds in the account of the customer, upon verification of available funds, providing an authorization code to the customer, the authorization code having a cash value associated therewith that equals the requested transfer of value, and deactivating the authorization code so that authorization code is no longer available to be provided to customers, the authorization code being selected from a plurality of active authorization codes, each with associated cash values, and which are stored in a memory device of the central server apparatus, providing a value added terminal remote to the central server apparatus, the value added terminal including a memory device that stores the authorization codes and their associated cash values, inputting the authorization code into an input device of the value added terminal that is capable of receiving a total number of authorization code inputs that is substantially greater than the number of authorization codes stored in memory, adding cash value onto the smart card in an amount equal to the cash value associated with the inputted authorization code, and deactivating the inputted authorization code in the memory device of the value added terminal, so that an attempt to re-input the same authorization code will not cause cash value to be added onto the smart card.

6. The method of claim 5 and further comprising the steps of, storing a screening code on the smart card for verifying that the smart card is authorized for use with the system, the screening code being unique to the money-activated machine of the system, and verifying the screening code prior to adding cash value onto the smart card.

7. The method of claim 5 and further comprising the step of, activating additional authorization codes in the memory device of the central server apparatus, each additional authorization code having a cash value associated therewith, and transferring the additional authorization codes to the memory device of the value added terminal.

* * * * *